United States Patent [19]

von Tomkewitsch et al.

[11] Patent Number: 4,548,740

[45] Date of Patent: Oct. 22, 1985

[54] METHOD OF PRODUCING CONDUCTIVE PLASTICS

[75] Inventors: Sybille von Tomkewitsch, Poecking; Hans-Friedrich Schmidt, Eurasburg, both of Fed. Rep. of Germany

[73] Assignee: Siemens Aktiengesellschaft, Berlin & Munich, Fed. Rep. of Germany

[21] Appl. No.: 569,444

[22] Filed: Jan. 9, 1984

[30] Foreign Application Priority Data

Jan. 19, 1983 [DE] Fed. Rep. of Germany ....... 3301635

[51] Int. Cl.$^4$ .............................................. H01B 1/06
[52] U.S. Cl. .................... 252/511; 252/502; 252/506; 264/105
[58] Field of Search ...................... 252/511, 502, 506; 524/495, 496, 401; 204/131.1, 144.5, 12, 13; 523/300; 264/105, 176 R, 211

[56] References Cited

U.S. PATENT DOCUMENTS

| 4,243,460 | 1/1981 | Nagler | 252/512 |
| 4,383,942 | 5/1983 | Davenport | 252/511 |
| 4,423,191 | 12/1983 | Haven et al. | 523/300 |
| 4,465,616 | 8/1984 | Nelson et al. | 252/511 |
| 4,465,617 | 8/1984 | Whipple et al. | 252/511 |

FOREIGN PATENT DOCUMENTS 2838110 3/1980 European Pat. Off. .
1550043 8/1979 Fed. Rep. of Germany .

Primary Examiner—Josephine L. Barr
Attorney, Agent, or Firm—Hill, Van Santen, Steadman & Simpson

[57] ABSTRACT

Conductive plastic parts having defined electrical properties within a relatively narrow range are produced by controlling the dosage relationship between a given plastic and a conductive material, such as long-chain conductive lampblack, as a function of an electrical value (i.e., surface resistance) measured at an extruded admixture of the plastic and conductive materials, rather than by a gravimetrical or volumetrical relation.

13 Claims, No Drawings

METHOD OF PRODUCING CONDUCTIVE PLASTICS

BACKGROUND OF THE INVENTION

1. Field of the Invention

The invention relates to conductive plastics and somewhat more particularly to a method of producing conductive plastic materials from a plurality of components having low conductivity tolerances by, for example, addition of conductive materials to select plastics.

2. Prior Art

It is known to admix plastics with conductive additives in order, among other things, to produce antistatic parts. To achieve this, lampblack, for example, is added to a plastic in a specified ratio and the admixture is formed, as by extrusion, into a desired part. The resultant surface resistance or, respectively, volume resistance, differs from a given part to another different part, depending on the intend use of such parts. Surface resistance above $10^{10}\Omega/\square$ and below $10^4\Omega/\square$ are attainable by means of a fixed material formula. However, it is not possible to work with a fixed material formula in the range lying between the above noted resistance values because slight differences in the quality of the components as well as minor fluctuations in the extrusion parameters lead to intolerable variations in resistance values.

Heretofore, the dosing relationship between a plastic material and a conductive material has been gravimetrically or volumetrically defined. However, this is disadvantageous because the properties of the individual components or materials are left out of consideration and, consequently, the final results vary greatly. Such results depend, for example, on the conductivity and, under given conditions, on the distribution of the particle size of the lampblack utilized.

At present, there is no possible way of measuring the conductivity of lampblack in the dosing step and to utilize such measured value for controlling the resistance of a formed part. Heretofore, as already mentioned, measuring or dosing of lampblack has been gravimetric or volumetric and the electrical resistance property was not checked until the finished injection-molded parts were available.

An apparatus for dosing a plurality of individual materials in a mixed material charge intended for processing in an extruder has been described and illustrated in German Offenlegungsschrift No. 28 38 110 and such apparatus may be used in the practice of the invention. This apparatus operates analogous to a differential control, so that a high degree of precision with respect to temperature and viscosity of the extruded material can be achieved.

SUMMARY OF THE INVENTION

The invention provides a process with which it is possible to produce plastic parts characterized with electrical properties that are defined within a relatively narrow range.

For example, plastic parts having a surface resistance of approximately $10^{10}\Omega/\square$ and a discharge time from 5000 to approximately 0 volts in less than about 100 ms can be produced by following the principles of the invention.

In accordance with the principles of the invention, the dosing relationship between a conductive additive and a plastic material are controlled as a function of an electrical value measured at an extruded admixture of the plastic and additive. The measured electrical value is the surface resistance or, respectively, the volume resistance of the extruded admixture.

In certain embodiments of the invention, the amount of conductive additive fed to the extruder is regulated as a function of the measured electrical value. In other embodiments of the invention, the amount of plastic material fed to an extruder is regulated as a function of the measured electrical value.

Further, in certain embodiments of the invention, a relatively inert additive, such as a mineral filler material, for example, special silicates, glass fibers, etc., is added to the extruder, along with the conductive material and the plastic, to obtain a better dispersion of the conductive additive within the extruded admixture.

DESCRIPTION OF PREFERRED EMBODIMENTS

In accordance with the principles of the invention, conductive plastic parts having electrical characteristics defined in a relatively narrow range are produced by controlling the dosage relationship between a given plastic material and a conductive material, such as a long-chain conductive lampblack, as a function of an electrical value measured at an extruded admixture of such materials.

The inventive process provides the advantage that, for example, the lampblack properties and/or the dispersion influences within the extruder are eliminated. The dispersion is influenced by a variety of factors, such as temperature, screw geometry, speed and volumetric rate of discharge.

Either the amount of the conductive material or the amount of plastic material can be varied with the principles of the invention to achieve the desired effect (i.e., narrowly defined electrical characteristics in the finished parts).

In preferred embodiments, the amount of conductive material is varied as a function of the measured electrical value in order to maintain the extruded material throughput quantity constant.

In order to achieve a better dispersion of materials within the extruded product, a defined introduction of inert filler additives, such as, for example, a mineral (i.e., special silicates, glass fibers, mixtures thereof and other fillers typically utilized by plastic manufacturers for increasing the mechanical properties or the like of a given polymer). With the controlled addition of a filler additive to a plastic-conductive material admixture, one is able to observe surface resistances within one power of ten in a finished product produced from the resultant admixture.

The inventive process is particularly suited for producing a conductive plastic part having a relatively high surface resistance and a discharge time from 5000 to approximately 0 volts in less than about 100 ms.

An example is now provided to further illustrate to those skilled in the art, the manner in which the invention is carried out. However, this example is not to be construed as limiting the scope of the invention in any way.

EXAMPLE

A given amount of a polyamide is mixed in an extruder of the type disclosed in the earlier-referenced German Offenlegungsschrift No. 28 38 110 with about 30% of an inert filler mineral (silica) and about 4 to 6% of a special long-chain conductive lampblack, all percentages being by weight, based on the weight of the polyamide. After proper admixing of the materials within the extruder, the electrical surface resistance of the extrudate (discharged material from the extruder) was measured and the dosage of the lampblack into the extruder was adjusted as a function of the difference between a desired electrical resistance (approximately $10^{10} \Omega/\square$) and the measured value. Once an acceptable electrical resistance value was attained, a desired part was produced from this admixture and upon testing exhibited a discharge time from 5000 to approximately 0 volts in less than about 100 ms.

As is apparent from the foregoing specification, the invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

We claim as our invention:

1. A process for producing a conductive plastic mixture comprising the steps of:
    admixing a selected amount of a plastic material with a selected amount of a conductive material and extruding to obtain a substantially uniform extrudate of said materials;
    measuring the electrical resistance of said extrudate;
    adjusting the quantity of said conductive material relative to the quantity of said plastic material in accordance with a function of the difference between a desired resistance value for such extrudate and such so-measured resistance value thereby to achieve and maintain approximately said desired resistance value for said extrudate.

2. The process of claim 1 wherein said plastic material comprises a polyamide.

3. The process of claim 1 wherein said conductive material is a long-chain lampblack.

4. The process of claim 3 wherein the quantity of said lampblack ranges from about 4 to 6 weight percent based upon the weight of said polyamide.

5. The process of claim 1 wherein an insert particulate mineral material is additionally admixed into said extrudate.

6. The process of claim 1 wherein such extrudate has a relatively high surface resistance and a discharge time ranging from about 5,000 to 0 volts in less than about 100 ms.

7. In a method for the production of a conductive plastic mixed extrudate which comprises a plastic material and a conductive material, the improvement which comprises measuring an electrical value of said extrudate and regulating the dosing relationship between said plastic material and said conductive material as a function of said measured electrical value.

8. The method of claim 7 wherein in said regulating the quantity of said plastic material is varied.

9. The method of claim 1 wherein in said regulating the quantity of said conductive material is varied.

10. The method of claim 7 wherein a mineral is additionally present in said extrudate to achieve a better dispersion of materials within said extrudate.

11. The method of claim 7 wherein said plastic material comprises a polyamide and said conductive material comprises a long-chain conductive lampblack and said extrudate has a discharge time of from about 5000 to 0 in less than about 100 ms, and wherein the quantity of said lampblack ranges from about 4 to 6 weight percent based upon the weight of said polyamide, and about 30 weight percent of a particulate mineral based upon the weight of said polyamide is additionally present in said extrudate.

12. A method for producing a conductive plastic mixture comprising the steps of:
    admixing a selected amount of a polyamide with a selected amount of a conductive long chain lampblack in the presence of a selected amount of a particulate inert silica filler and extruding to obtain a substantially uniform extrudate,
    measuring the electrical resistance of said extrudate,
    adjusting the quantity of said lampblack relative to said polyamide in accordance with a function of the difference between a desired resistance value for such extrudate and such so-measured resistance value thereby to achieve and maintain approximately said desired resistance value for said extrudate.

13. The method of claim 12 wherein said extrudate contains from about 4 to 6 weight percent of said lampblack and about 30 weight percent of said silica, based upon the weight of said polyamide, and said extrudate has a discharge time of from about 5000 to 0 volts in less than about 100 ms.

* * * * *